July 9, 1929.                F. W. JOHNSON                 1,720,600
                              INCUBATOR
                  Original Filed Nov. 21, 1927    2 Sheets-Sheet 1
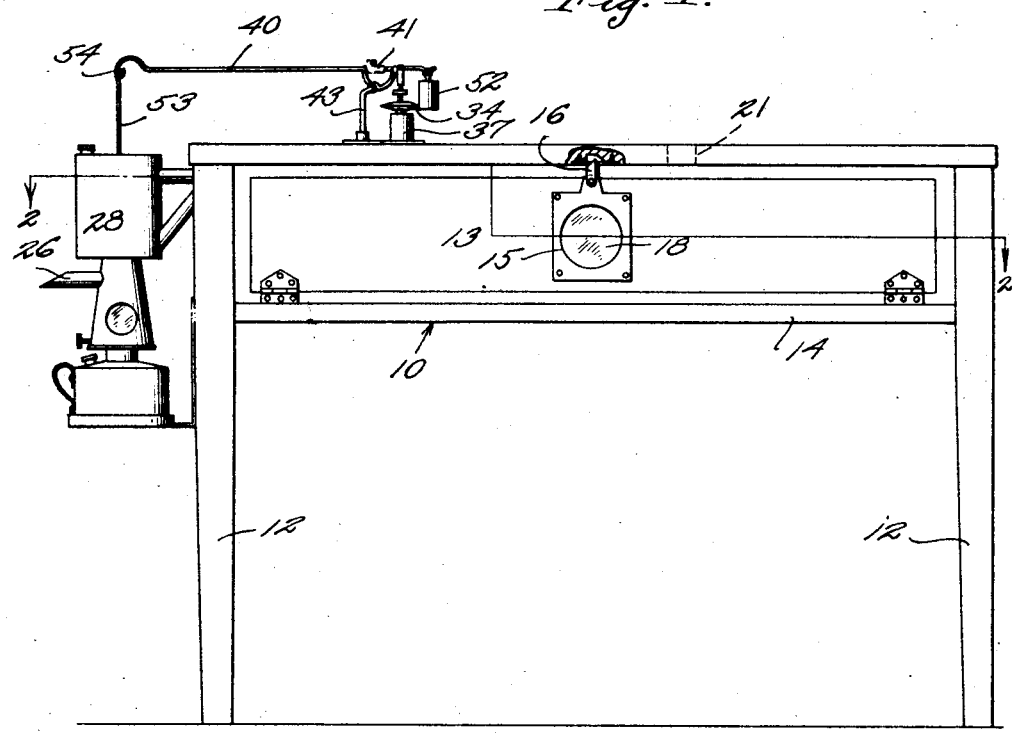
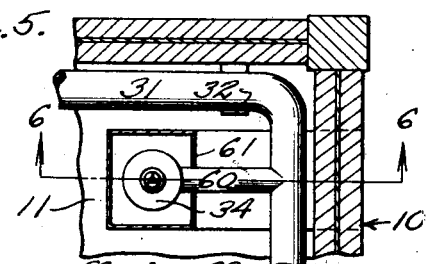
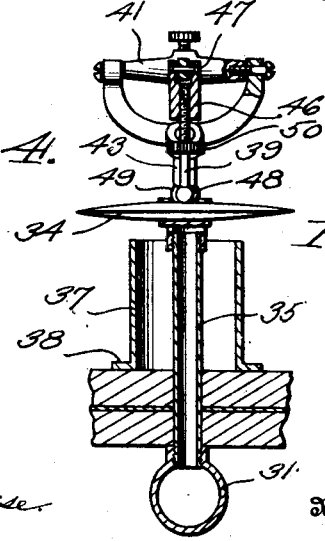
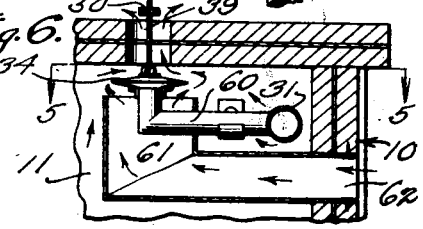
Fred W. Johnson, Inventor July 9, 1929.  F. W. JOHNSON  1,720,600
INCUBATOR
Original Filed Nov. 21, 1927   2 Sheets-Sheet 2

Witnesses:

Fred W. Johnson
Inventor
By Victor J. Evans
Attorney

Patented July 9, 1929.

1,720,600

UNITED STATES PATENT OFFICE.

FRED W. JOHNSON, OF KEARNEY, NEBRASKA.

INCUBATOR.

Application filed November 21, 1927, Serial No. 234,838. Renewed February 27, 1929..

The present invention relates to incubators and particularly to that type of incubators in which the heat thereof is thermostatically and automatically regulated.

A primary object of the invention is to so locate the thermostatic element that when the heating fluid of the incubator cools below the temperature of which the incubator mechanism is set, the thermostatic element will more quickly set the heating apparatus in operation. than is the case in incubators as at present used.

Another and more important object is to subject the thermostatic unit to not only the influence of the heat in the heating system but also to the influence of the atmosphere surrounding the incubator.

Other objects are simplicity, of the construction, effectiveness in operation, and cheapness in manufacture.

Still other objects and advantages of my invention will appear from the following specification, and will be set forth in the appended claims, and I do not wish to be limited in the scope of my invention, except as I shall be limited by the scope of said claims.

In the drawings:

Figure 1 is a side elevation of one form of my incubator device with the heating unit and the thermostatic control mounted thereon.

Figure 4 is a detail sectional view on the line 4—4 of Figure 3 showing the connecting of the thermostatic units with the heating device of the incubator.

Figure 5 is a fragmentary view showing a slightly different arrangement of the thermostatic unit on the line 5—5 of Figure 6.

Figure 6 is a fragmentary view similar to Figure 5 and on the line 6—6 of Figure 5.

Figure 2:
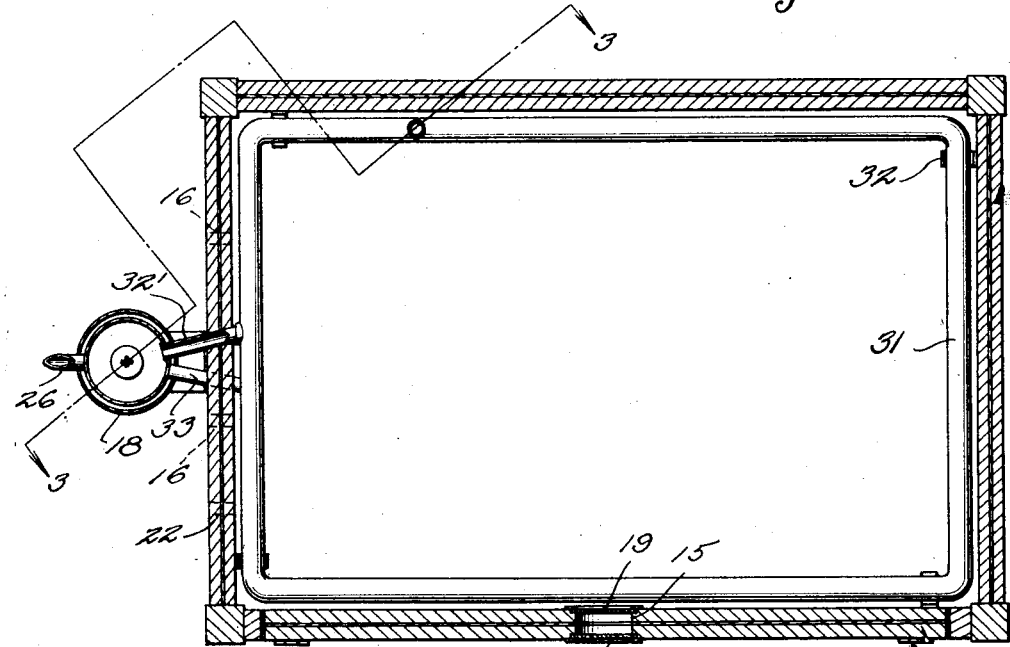
Figure 2 is a plan view of the incubator with the cover removed.
Figure 3:
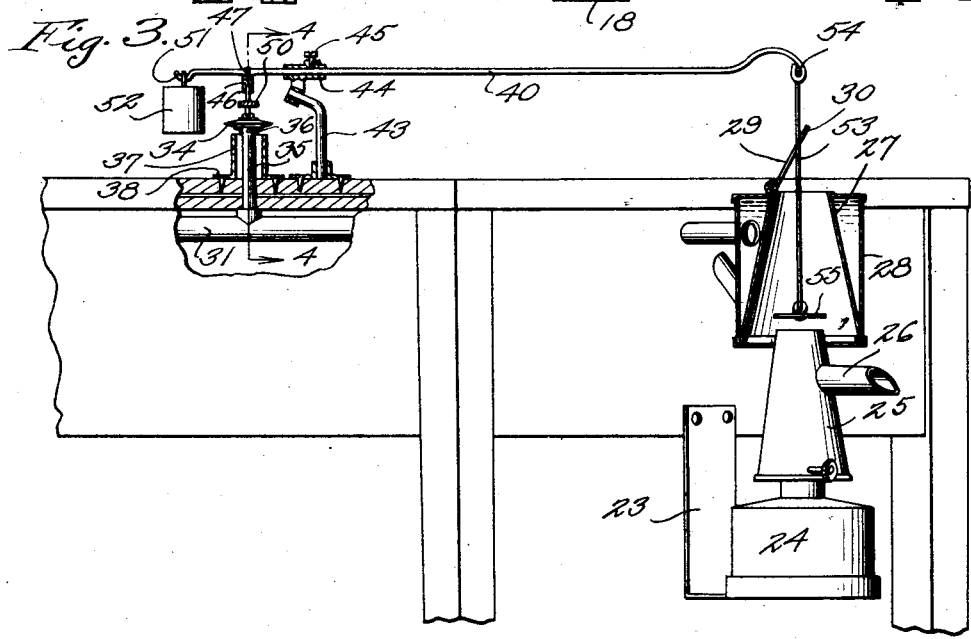
Figure 3 is a fragmentary side elevation showing the part in section on the line 3—3.

Referring to the drawings in detail, the same characters designating the same parts in all views of the drawings, 10 designates a table having an incubator compartment 11 and supported by legs 12, said compartment having the front side thereof closed by a door 13 through the frame member 14, said door being provided with a peep hole 15 and a latch 16 for keeping it closed. The peep hole may be covered on both sides by small panes of glass 18 and 19 as shown in Figure 2 of the drawings. The top 20 of the incubator compartment is provided with an air hole 21 and air holes 22 are provided in the side of the casing for ventilating the interior of the casing. Mounted on the side of the table as upon a bracket 23 attached thereto is a heating unit 24 in the form of a lamp having a frusto-conical metallic chimney extending upwards therefrom, which chimney may be provided near its upper end with a spout or pipe 26 for carrying off smoke and other waste products of combustion.

The upper end of the chimney is set into a larger frusto-conical member 27 having a water jacket 28 cylindrical in its outer contour connected therewith and surrounding the member 27 throughout its length. The upper end of this second frusto-conical member may be provided with a cover plate 29 hinged at one side to the member 27 and adapted to cover the upper end thereof, said cover being provided with a slot 30 to permit free operation of the wire attached to the thermostatic control which will presently be described.

Located within the incubator attachment 11 is a pipe 31 which preferably surrounds the compartment on its interior wall and is attached to the interior walls as by brackets 32. The water jacket 28 is connected with this pipe by means of conduits 32' and 33, the former being the inlet conduit and the latter being the return to the water jacket, the operation thereof being the well known principle that heated water will rise and the colder water will tend to flow to the lower lever. The thermostatic control comprises a thermostatic unit 34 of the wafer type as shown and which is connected to the upper end of a short length of pipe 35 in communication with the pipe 31. The upper end of the pipe has small apertures 36 for the escape of steam about a thermostatic unit, and said tube is surrounded by a sleeve 37 connected by a flange 38 to the upper surface of the top of the incubator compartment.

The purpose of the tube is to prevent the dissipation of the heat passing upward through the pipe 35 and to direct it around the lower side of the thermostatic wafer. The upper side of the thermostatic wafer is connected to a lever 40 by means of the rod 39, the lever 40 being pivotally supported by trunnions 41 upon the bracket which is in turn supported by a supporting rod 43 attached to the top of the incubator compartment. The connection between the trunnions and the lever rod 40 is made adjustable by slidably mounting the said lever in the sleeve 44 and may be held in its adjusted position by a set screw 45.

The upper end of the rod 39 is threaded and is adjustably connected with a sleeve 46 pivotally connected to the lever 40 as at 47. In order that the rod 39 may be free to turn for adjustment of the connection with the lever, the lower end is provided with a ball 48 fitting in the socket 49 and constituting a ball and socket joint on the top of the thermostatic wafer. The rod may also be provided with a thumb nut 50, for the purpose of more easily turning the same. The rear end of the lever 40 may be hooked as shown at 51 and a suitable weight 52 may be carried thereby.

The opposite end of the lever extends to a point above the heating unit and is pivotally connected at 54 with the wire 53 which extends down into the frusto-conical jacket 27, the lower end of said wire playing a damper 55 which it will be understood can be raised or lowered as the thermostatic wafer contracts or expands under the influence of heat from the pipe 35 and the surrounding atmosphere. By arranging the thermostatic unit on the outside of the incubator compartment, it will more quickly respond to the cooling influence due to the lowering of the temperature within the casing inasmuch as it also is exposed to the outside air. It will also be influenced by the outside air to prevent the rapid cooling of the incubator in cold weather, and by locating the thermostatic unit 34 within the incubator compartment as shown in Figures 5 and 6 and connecting the same with the pipe 31 by an elbow connection, 60, and surrounding the said connection by a casing 61 opening at 62 to the outside atmosphere a similar result may be obtained.

What I claim is:

1. In an incubator having a compartment for holding the eggs, a heating system comprising a heating element connected with a circulating pipe within the compartment, a pipe extending from said circulating pipe to a point above the top of the compartment and having a thermostatic unit connected therewith, a lever arm connected with the opposite surface of the thermostatic unit from that to which the pipe is connected, and means connected with the lever for regulating the heating unit.

2. In a device of the character described, an incubator compartment having circulating pipes therein, a heat unit connecting with said circulating pipes and a pipe projecting through the top of the incubator compartment and in communication with said circulating pipes, a thermostatic unit having one side thereof secured to the projecting end of said pipe and the opposite side of the thermostatic unit being connected to a lever, said lever being pivotally supported on top of the incubator and having a damper pivotally connected at one end and adapted to regulate the heat in the heat unit.

3. In a device of the character described, an incubator comprising a compartment having a circulating pipe therein, a heat unit connected with said circulating pipe and a pipe having communication with said circulating pipe and being provided at its opposite end with a thermostatic unit, one side of the unit being exposed to the pipe, the opposite side of said thermostatic unit being exposed to the outside air and having an adjustable connection with a lever arm supported on the top of the incubator compartment, said arm having means thereon for controlling the heat in the heat unit.

In testimony whereof I affix my signature.

FRED W. JOHNSON.